United States Patent
Kaiser et al.

(10) Patent No.: US 9,453,603 B2
(45) Date of Patent: Sep. 27, 2016

(54) ARRANGEMENT FOR THE FLUIDIC AND MECHANICAL CONNECTION OF TWO COMPONENTS

(75) Inventors: Sven A. Kaiser, Winnenden (DE); Andreas Kuske, Geulle (NL); Thomas Proettel, Esslingen (DE); Daniel Roettger, Eynatten (BE); Franz A. Sommerhoff, Aachen (DE); Christian Vigild, Aldenhoven (DE)

(73) Assignees: Mahle International GmbH (DE); Fordwerke GmbH (DE)

( * ) Notice: Subject to any disclaimer, the term of this patent is extended or adjusted under 35 U.S.C. 154(b) by 270 days.

(21) Appl. No.: 14/240,740

(22) PCT Filed: Aug. 23, 2012

(86) PCT No.: PCT/EP2012/066383
§ 371 (c)(1),
(2), (4) Date: Jul. 14, 2014

(87) PCT Pub. No.: WO2013/026894
PCT Pub. Date: Feb. 28, 2013

(65) Prior Publication Data
US 2014/0366972 A1 Dec. 18, 2014

(30) Foreign Application Priority Data
Aug. 25, 2011 (DE) .................. 10 2011 081 578

(51) Int. Cl.
*F02M 35/02* (2006.01)
*F16L 27/107* (2006.01)
(Continued)

(52) U.S. Cl.
CPC ............. *F16L 37/46* (2013.01); *F02D 9/1035* (2013.01); *F02M 35/0204* (2013.01);
(Continued)

(58) Field of Classification Search
CPC ...... F16L 37/46; F16L 37/088; F16L 55/027; F16L 27/107; F16L 27/108; F16L 37/144; F02M 35/0204; F02M 35/10144; F02D 9/1035; Y10T 137/9029
USPC .................................................. 251/142–150
See application file for complete search history.

(56) References Cited

U.S. PATENT DOCUMENTS

| | | | |
|---|---|---|---|
| 2,998,270 A | 8/1961 | Watkins | |
| 3,574,354 A | 4/1971 | Mischel | |

(Continued)

FOREIGN PATENT DOCUMENTS

| | | | |
|---|---|---|---|
| CH | 378114 A | 5/1964 | |
| DE | 376732 C | 6/1923 | |

(Continued)

OTHER PUBLICATIONS

English abstract for DE-3932300.
(Continued)

*Primary Examiner* — Marina Tietjen
(74) *Attorney, Agent, or Firm* — Fishman Stewart PLLC

(57) ABSTRACT

An arrangement for a fluidic and mechanical connection of two components may include a first component, a second component, and a coupling. The coupling may include a first coupling part arranged on the first component and a second coupling part. A damping part may moveably connect the second coupling part to the second component. An axial overlap region may be formed between the damping part and the second coupling part, which axially on the side facing the first component is bounded by a connecting region for realizing a mechanical connection between the second coupling part and the damping part. The second coupling part may coaxially plug into the first coupling part for fluidic and mechanical connection. At least one sealing element may be radially arranged between the first coupling part and the second coupling part.

20 Claims, 2 Drawing Sheets

(51) Int. Cl.
*F16L 37/46* (2006.01)
*F02M 35/10* (2006.01)
*F02D 9/10* (2006.01)
*F16L 27/108* (2006.01)
*F16L 37/088* (2006.01)
*F16L 55/027* (2006.01)

(52) U.S. Cl.
CPC ..... *F02M 35/10144* (2013.01); *F16L 27/107* (2013.01); *F16L 27/108* (2013.01); *F16L 37/088* (2013.01); *F16L 55/027* (2013.01); *Y10T 137/9029* (2015.04)

(56) References Cited

U.S. PATENT DOCUMENTS

| | | | |
|---|---|---|---|
| 3,770,303 | A | 11/1973 | Hallett |
| 4,526,409 | A | 7/1985 | Schaefer |
| 5,159,811 | A | 11/1992 | Hefler et al. |
| 2009/0058083 | A1* | 3/2009 | Dorman ................ F16L 37/144 285/309 |
| 2009/0126670 | A1* | 5/2009 | Kado .................... F02D 9/1035 123/184.21 |

FOREIGN PATENT DOCUMENTS

| | | | |
|---|---|---|---|
| DE | 2021626 A1 | 11/1970 | |
| DE | 2222355 A1 | 11/1972 | |
| DE | 2455065 A1 | 5/1975 | |
| DE | 3932300 A1 | 4/1991 | |
| DE | 9205401.3 | 4/1992 | |
| DE | 69019360 T2 | 2/1996 | |
| EP | 0647779 A1 | 4/1995 | |
| GB | 1486240 A * | 9/1977 | .............. F16L 19/04 |
| SE | DE 102008021326 A1 * | 11/2008 | ............ F16L 21/065 |

OTHER PUBLICATIONS

English abstract for EP-0647779.
International Search Report for PCT/EP2012/066383.
English translation of International Preliminary Report.

* cited by examiner

ARRANGEMENT FOR THE FLUIDIC AND MECHANICAL CONNECTION OF TWO COMPONENTS

CROSS-REFERENCE TO RELATED APPLICATIONS

This application claims priority to German Patent Application No. 10 2011 081 578.3, filed Aug. 25, 2011, and International Patent Application No. PCT/EP2012/066383, filed Aug. 23, 2012, both of which are hereby incorporated by reference in their entirety.

TECHNICAL FIELD

The present invention relates to an arrangement for the fluid and mechanical connection of two components. The invention furthermore relates to a coupling for such an arrangement.

BACKGROUND

To fluidically connect two components, a coupling is often used. The fluidic connection as a rule is also accompanied by a mechanical connection. The coupling usually comprises two coupling parts, which are each fluidically and mechanically connected to one of the components. The respective coupling parts can have different shapes and sizes, by way of which components of different design can be fluidically and mechanically connected to one another. A fluidic connection between the components is ensured in that the two coupling parts are also fluidically and mechanically connected to one another. In particular, in order to prevent or reduce the transmission of mechanical vibrations of the one component to the other component, the coupling can be equipped in principle with a damping part. The damping part in this case is arranged axially spaced from both coupling parts and connected to these, so that mechanical vibrations of the respective component, which are also transmitted to the associated coupling part, are dampened and thus not transmitted to the other coupling part or the other component. However, such an arrangement requires appropriate space for the fluidic and mechanical connection between the components. In many applications of such arrangements, for example in vehicles, a reduced space requirement of such arrangements is desirable however.

SUMMARY

The present invention deals with the problem of stating an improved or at least alternative embodiment for an arrangement for the fluidic and mechanical connection of two components, which is characterized in particular by a simplified assembly and/or a space-saving construction.

The present invention is based on the general idea of arranging a damping part in the circumferential direction about a coupling part of a coupling of an arrangement for the fluidic and mechanical connection of two components that can be easily assembled or disassembled and thus design the arrangement in a more space-saving manner. Here, the coupling comprises two coupling parts which are coaxially plugged and each of which are fluidically and mechanically connected to one of the components. The damping part in particular serves the purpose of preventing or at least reducing the transmission of mechanical vibrations of one of the components to the other component. Here, an axial overlap region is formed between the damping part and the coupling, in particular between the damping part and one of the coupling parts. The damping part and the coupling part preferentially run axially parallel, in particular coaxially within this overlap region, which is provided in addition to a connecting region of the damping part to the coupling part. One of the coupling parts is thus coaxially plugged into the other coupling part, by way of which the two coupling parts of the coupling are fluidically and mechanically connected to one another. According to the invention, the damping part connects the outer part to the associated component facing away from the inner coupling part. The mechanical connection between the damping part and the coupling part connected to said damping part is realised in particular in the connecting region. The overlap region is arranged on a side of this coupling part facing away from the other component, within which the damping part axially overlaps the coupling part connected thereto at least in a portion. Here, the entire axial length of the damping part can be longer or shorter than the axial length of the overlapped coupling part or equal in length. In particular, the overlap region can also at least partially axially overlap the other coaxially plugged coupling part. In addition, the overlap region can be axially bounded by said connecting region.

With the arrangement according to the invention it is thus possible in particular to exclusively connect the outer coupling part to the associated component by means of the damping part.

In accordance with the inventive idea, the arrangement comprises the two coupling parts, wherein one of the coupling parts is arranged on the first component. In order to render the description easier to understand in the following, a first coupling part and a second coupling part are distinguished in the following. It is to be understood, however, that the first coupling part and the second coupling part are interchangeable with the characteristics mentioned in the following, without leaving the scope of this invention. Thus, the first coupling part is now arranged on the first component and in particular fluidically and mechanically connected to said component. The second coupling part that is plugged to the first component is furthermore at least partially axially overlapped by the damping part and thus enclosed in the circumferential direction, wherein the second coupling part is connected to the damping part in a fluid-tight, in particular materially joined, non-positively joined or mechanically connected manner. Thus, the damping part axially overlaps the second coupling part in the overlap region, wherein the overlap region is axially bounded by the connecting region on the side facing the first component, in which connecting region the mechanical connection between the second coupling part and the damping part is realised. In addition, the damping part and the second coupling part are arranged preferably axially parallel, preferentially coaxially in particular in the overlap region. The damping part thus moveably connects the second coupling part to the second component. This means in particular that the second coupling part is moveable relative to the second component, wherein the mechanical connection of the second coupling part or the coupling to the second component is realised by means of the damping part. According to the invention, the damping part is now designed in such a manner that it prevents or at least reduces the transmission of mechanical vibrations of the one component to the other component. The damping part to this end can be designed for example springily or elastically, wherein the mechanical vibrations of the one component are offset through the springy characteristic of the damping part. During the springing of the damping part, the kinetic energy of the vibrations is converted for example into heat or into the deformation of the damping part, as a result of which the vibration is dampened. Preventing or reducing the vibration transmission of the second component to the first component in this case is realised in that the damping part is connected to the second component, dampening the mechanical vibrations of this component. In addition, the damping part is connected to the first component with the second coupling part plugged to the first coupling part and can dampen the vibrations of the first component. Because of this, the transmission of the vibrations of the first component to the second component is prevented or at least reduced. The damping part consequently serves the purpose in particular to dampen vibrations of the respective component, for example through the springy or elastic characteristic. Enclosing the second coupling part by the damping part does not necessarily mean that the damping part surrounds the second coupling part along the entire circumference. Such enclosure along the entire circumference of the second coupling part is preferred however.

The arrangement according to the invention serves for the fluidic and mechanical connection of any two components. Examples for such components or connections are applications in the vehicle sector. Thus, the arrangement can serve in particular for the fluidic and mechanical connection of air lines, in particular clean air lines, raw air lines as well as charge air lines. The relevant components are therefore pipes, housings, cans, containers as well as diffusers for example. Accordingly, at least one of the coupling parts can be designed as a connector, which is arranged on and connected to one of the components, for example a pipe or hose line.

According to a preferred embodiment, the damping part is designed as a bellows. The damping part that is designed as a bellows has in particular an elastic characteristic and is preferentially produced from plastic. Here, the bellows can in particular spring axially. In addition, the bellows encloses the second coupling part along the entire circumference. The bellows is practically mechanically connected on the one side within the connecting region to the second coupling part and on the other side to the second component within a connecting portion, wherein it axially overlaps the second coupling part between the connecting region and the connection portion in the overlap region. The mechanical connection between the second coupling part and the bellows can for example be realised in that the second coupling part in the connecting region comprises a shoulder running in circumferential direction, on which the bellows is arranged and which the bellows can axially enter. The bellows can have any number of pleats, wherein the bellows preferentially has a single such pleat, in particular in order to improve the space-saving characteristic of the arrangement. In addition, the at least one pleat of the bellows is preferably arranged in the overlap region or forms the overlap region.

Preferred is an embodiment, in which the coupling parts as well as the damping part are formed symmetrically, in particular rotation-symmetrically. Such a design simplifies in particular a suitable assembly of the arrangement.

According to a further preferred embodiment, the second coupling part comprises an end portion facing the second component, wherein the end portion projects into the second component in a free-standing manner. The end portion bounds an overlap region of the second coupling part on the side axially facing away from the first component. The overlap portion describes a portion of the second coupling part, which is overlapped by the damping part in the overlap region. The end portion of the second coupling part facing the second component is thus arranged in the interior of the second component or a corresponding portion of the second component, wherein the arrangement of the end portion in the second component is effected in a contactless manner. The end portion and thus the second coupling part are consequently moveable relative to the second component. Accordingly, the transmission in particular of vibrations of the second component to the second coupling part plugged to the first coupling part is prevented, by way of which the transmission of the corresponding vibrations from the second component to the first component is also prevented. The same applies to the transmission of vibrations of the first component to the second component. The damping part in this case can additionally ensure fluidic tightness of the arrangement in the overlap region and/or in the connecting region and/or in the connection portion. The damping part axially overlaps the second coupling part along the overlap region and thus encloses the overlap portion of the second coupling part preferentially along the entire circumference. In addition, the damping part is mechanically connected to the second component and the second coupling part in the connecting region and in the connection portion in such a manner that escaping of a corresponding fluid is prevented.

Here, the damping part in preferred embodiments is connected to the second component through a clamp. If the second component or the corresponding portion of the second component has a rotational-symmetrical shape, the clamp is thus also designed ring-shaped. Embodiments are also conceivable, in which the damping part and the second component are connected to one another in a materially joined manner, in particular welded or glued. The respective connection in this case is practically realised in the connection portion.

The free-standing arrangement of the end portion of the second coupling part in the second component is realised in a preferred embodiment in such a manner that the end portion is radially spaced from the second component or from the corresponding portion of the second component. When the end portion and the corresponding portion of the second component for example have a rotation-symmetrical shape, in particular the shape of a hollow cylinder, an outer diameter of the end portion is smaller than an inner diameter of the corresponding portion of the second component.

In an advantageous embodiment, the first coupling part and/or the second coupling part comprise/s at least in one portion, a tulip-like shape. The tulip-like shape in this case serves in particular the purpose of improving a flow behaviour of the corresponding fluid through the arrangement. When the fluid for example flows from the second component to the first component, the end portion of the second coupling part which in particular is subject to the inflow, is formed tulip-like. The end portion of the second coupling part is thus designed in particular as an inflow tulip, which preferentially projects into the second component in a free-standing manner. The same applies when the fluid flows from the first component to the second component. In this case, a portion of the first coupling part which faces in particular the first component is designed tulip-like. In particular, the tulip-like design is arranged in the connection portion.

Also preferred is an embodiment, in which the coupling in its interior comprises a control element. Here, the control element serves in particular the purpose of controlling the flow of the corresponding fluid. The control element can be formed in particular as a throttle flap. However, embodiments in which the control element is designed as a valve are also conceivable. In addition, the control element is preferentially arranged in one of the coupling parts. This means in particular that the first coupling part and/or the second coupling part comprise/s such a control element. When one of the coupling parts is designed as a connector and comprises such a control element, the coupling part can be designed in particular as a throttle flap connector or as a valve connector. Such coupling parts are employed for example in such arrangements for supercharging devices, in particular for turbochargers.

As already mentioned, the first coupling part and the second coupling part are coaxially plugged. According to a preferred embodiment, the connection between the coupling parts is ensured by means of a ring-shaped locking element. The locking element in this case is arranged radially between the coupling parts. To this end, the locking element preferentially engages on the one hand into an inner groove of the one coupling part and on the other hand in an outer groove of the other coupling part which is radially aligned thereto, wherein the coupling part comprising the outer groove is practically plugged into the coupling part comprising the inner groove. The ring-shaped design of the plug element in this case merely refers to a state in which the locking element is arranged in the corresponding groove or in the grooves. Accordingly, the coupling parts have a circular shape in regions comprising the groove. The locking element can in particular be pulled out of the grooves through applying a suitable mechanical force, by way of which the connection between the coupling parts is disconnected. Preferred in this case is an embodiment, in which the locking element can be introduced and removed through a radial opening of the coupling part located outside in the corresponding groove, i.e. in the inner groove. The coupling part, into which the other coupling part is plugged, thus comprises the radial opening into which the locking element can be introduced and from which it can be removed. Here, the locking element is introduced or arranged in the inner groove in such a manner that it makes possible a plugging operation of the coupling parts. The locking element in this case can be designed in particular and/or arranged in such a manner that it is preassemblable on the outer coupling part and during the plugging operation spring-elastically yields and engages in the outer groove, thus locking the coupling parts. To this end, the plugged-in coupling part can have a corresponding outer contour. The corresponding grooves are further preferably realised in a fastening portion of the second coupling part, which is preferentially arranged on an end of the second coupling part facing the first coupling part, thereby axially bounding the overlap portion.

Further preferred is an embodiment, in which the damping part concentrically encloses the second coupling part. This means in particular that the damping part and the second coupling part have a common longitudinal centre axis. To this end, the damping part and the second coupling part are preferentially designed rotation-symmetrically. Practically, the second component, or the corresponding portion of the second component, are then also designed rotation-symmetrically and in a force and vibration-free state are likewise arranged concentrically to the second coupling part and the damping part.

In order to ensure a tightness of the coupling, at least one sealing element, for example an O-ring, is radially arranged between the coupling parts in a further preferred embodiment. Thus, when the coupling parts are designed rotation-symmetrically, the sealing element can for example be designed ring-shaped. Furthermore, the sealing element can be arranged at least partially in corresponding recesses in the outer contour or inner contour of the coupling parts. This means in particular that the plugged-in coupling part has such an extension in the outer contour while the other coupling part has such an associated recess in the inner contour, the sealing element being arranged in both recesses. For a practical tightness through the sealing elements it is also adequate however when merely one of the coupling parts has such a recess. The recess of the second coupling part can be arranged in the overlap portion or in the fastening portion.

In a further embodiment, the second coupling part and the damping part are formed in one piece. Thus, this means in particular that the second coupling part and the damping part can be produced from a plastic, wherein the second coupling part and the damping part are produced together through an injection moulding method. In this embodiment, the damping part is consequently a constituent part of the coupling. Alternatively, the second component and the damping part can be designed in one piece. The second component, in particular the corresponding portion of the second component, and the damping part can thus be produced in particular from plastic. In this embodiment, the damping part is thus a constituent part of the second component.

It is pointed out that the coupling of the arrangement for the mechanical and fluidic connection of the components, in particular in a one-piece embodiment with the damping part, as an important constituent part of the invention, as such also belongs to the scope of this invention.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically.

DETAILED DESCRIPTION

Figure 2:
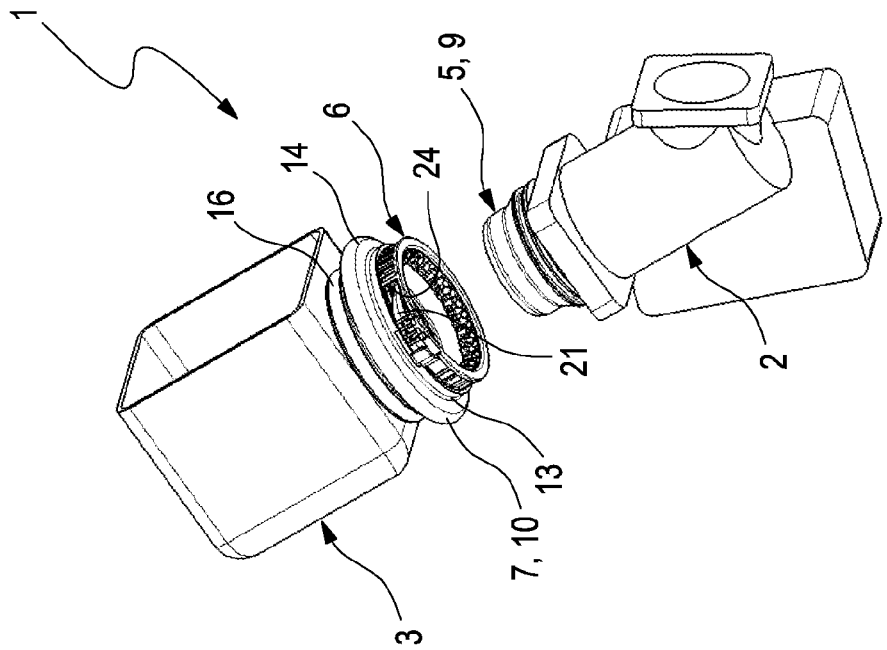
FIG. 2 an isometric view of the arrangement in the non-plugged state.
Figure 1:
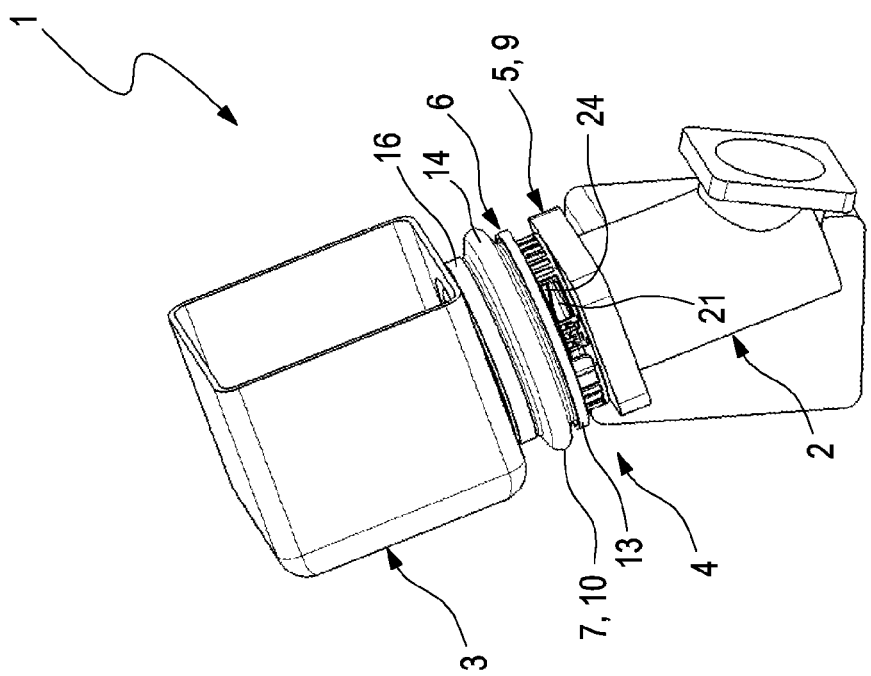
FIG. 1 an isometric view of an arrangement.
Figure 3:
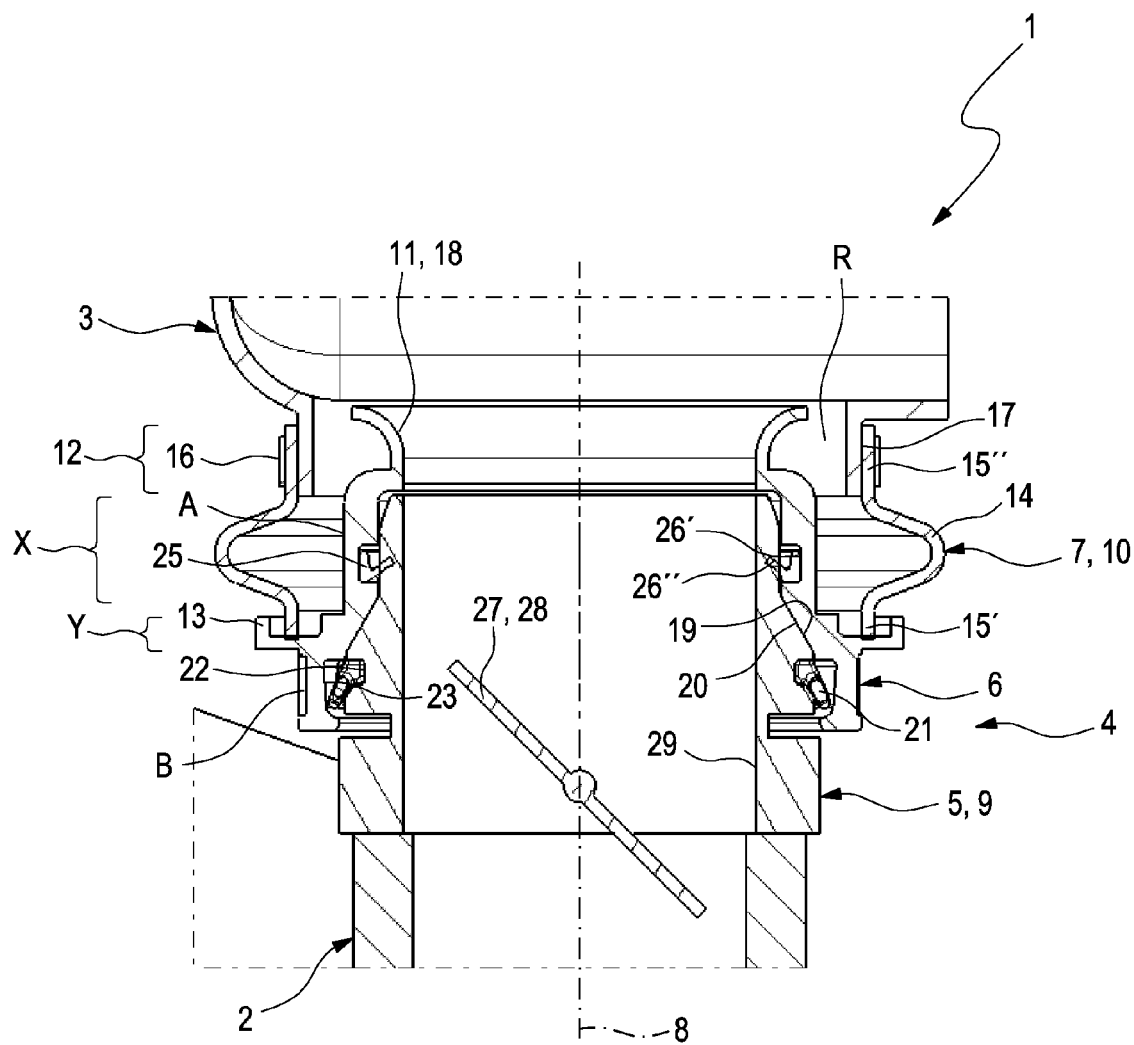
FIG. 3 an axial section through the arrangement.

FIGS. 1 to 3 show an arrangement 1 for the fluidic and mechanical connection of two components 2, 3 by means of a coupling 4. The first component 2 in this case is designed as a line 2, while the second component 3 is designed as a container or housing 3, for example of an air filter. Accordingly, the fluidic and mechanical connection of the first connection 2 to the second component 3 by means of the coupling 4 serves for transporting a gas as a fluid. The arrangement 1 according to the invention comprises two coupling parts 5, 6 of the coupling 4 and a damping part 7. The two coupling parts 5, 6 are designed rotation-symmetrically and plugged coaxially. In the shown embodiment, this means that the first coupling part 5 is plugged into the second coupling part 6, wherein both coupling parts 5, 6 have a common longitudinal centre axis 8. As is shown in FIG. 2, the two coupling parts 5, 6 can be additionally plugged into one another. The first coupling part 5 in the shown embodiment is designed as a connector 9 and arranged on and connected to the first component 2. The second coupling part 5 is thus designed in particular as the connector 9 of the first component 2. The first coupling part 5 in its interior additionally has the shape of a hollow cylinder and is thus fluidically connected to the first component 2.

The damping part 7 in the shown embodiment is designed as a bellows 10. According to the invention the damping part 7 which is designed as a bellows 10 moveably connects the second coupling part 6 to the second component 3 and is arranged coaxially to the latter. This means that the second coupling part 6 is moveable relative to the second component 3. Thus, the second coupling part 6 is connected to the second component 3 exclusively via the damping part 7. As is shown in FIG. 3, the second coupling part 6 has a tulip-like shape on an end portion 11 facing the second component 3. Here, the end portion 11 of the second coupling part projects into the second component 3, in particular in a corresponding connection portion 12 of the second component 3, and is arranged therein in a freestanding manner. The end portion 11 of the second coupling part 6 is thus arranged within the connection portion 12 of the second component 3, wherein the end portion 11 is radially spaced from the connection portion 12. The connection between the second coupling part 6 and the second component 3 is ensured by means of the damping part 7. To this end, the damping part 7 concentrically encloses the second component in the connection portion 12 and thus along the entire circumference of the second coupling part 6. The damping part 7 is now connected to the second coupling part 6 on the one hand and to the second component 3 on the other hand. For the connection to the damping part 7, the second coupling part 6 has a shoulder 13 which radially runs over the entire circumferential direction in a connecting region Y. The damping part 7 designed as a bellows 10 in this case comprises a single pleat 14, from which a fastening portion 15 in each case projects in axial direction. One of the fastening portions 15' of the damping part 7 is arranged in the connecting region Y on the should 13 of the second damping part 6 and axially projects into the shoulder 13, thereby connecting the damping part 7 to the second coupling part 6. The other connecting portion 15" radially encloses the second component 3 in the connection portion 12 along the entire circumference. A connection between the second fastening portion 15" and the connection portion 12 and thus between the damping part 7 and the second component 3 in this case is realised via a clamp 16, which is designed ring-like and presses the second connection portion 15" of the damping part 7 against an outside 17 of the connection portion 12 of the second component 3. Because of this, an overlap region X is provided, which axially overlaps along an overlap portion A of the second coupling part 6, which is axially bounded on the side facing the second component 3 by the tulip-like end portion 11 and on the side facing the first component 2 is axially bounded by a fastening portion B, in which the connection between the coupling parts 5, 6 is realised.

In addition, an annular space R is created, which is fluidically connected to the second component 3 and axially extends between the end portion 11 and the shoulder 13. On the one hand, the fluidic connection produced between the components 2, 3 by means of the coupling 4 is tight. On the other hand, the transmission of mechanical vibrations from one of the components 2, 3 to the other component 2, 3 is prevented or at least reduced through the elastic or springy characteristic of the damping part 7 designed as a bellows 10. Thus, mechanical vibrations of the second component 3 result in an elastic deformation of the damping part 7 and thus to a corresponding removal of the kinetic energy of the vibrations, by way of which a transmission to the second coupling part 6 and the first coupling part 5 plugged thereto and consequently to the first component 2 is prevented or at least reduced. Accordingly, vibrations of the first component 2 result in vibrations of the first coupling part 5 and thus of the second coupling part 6 plugged thereto, which in turn results in an elastic deformation of the damping part 7, by way of which a transmission to the second component 3 is prevented or at least reduced. The arrangement 1 results in a reduced space requirement in particular through the arrangement of the damping part 7, which is desirable in many application areas of such arrangements 1, for example in motor vehicles. Furthermore, the second coupling part 6 and the damping part 7 can be formed in one part or in one piece. The second coupling part 6 and damping part 7 can for example be produced from a plastic through an injection moulding method. This results in particular in a cost-effective production of the arrangement. Alternatively, the second component 3, in particular the connection portion 12 of the second component 3, and the damping part 7 can be formed in one piece.

The tulip-like design of the end portion 11 of the second coupling part 6 serves in particular the purpose of improving the flow behaviour of the fluid. Here, the fluid can flow from the second component 3 to the first component 2. The end portion 11 of the second coupling part 6 is then designed as an inflow tulip 18 in particular. In other embodiments, the through-flow direction can be inverted. The tulip-like end portion 11 then forms an outflow region, wherein the fluid is subjected to a gentle transmission into the volume of the second component 3. The tulip-like end portion 11 ends, as shown in FIG. 3, preferably in the axial region, in which the large volume of the second component 3 commences.

As already mentioned, the first coupling part 5 can be plugged into the second coupling part 6. To this end, an outer contour 19 of the first coupling part 5 has a shape which is complementary to an inner contour 20 of the second coupling part 6. In order to ensure a connection between the coupling parts 5, 6 a locking element 21 is provided. The locking element 21 in this case is annularly arranged in the plugged-in state, between the first coupling part 5 and the second coupling part 6. The connection between the coupling parts 5, 6 is realised in that the locking element 21 in the plugged-in state, engages on the one hand in an outer groove 22 of the outer contour 19 of the first coupling part and on the other hand engages into an inner groove 23 of the inner contour 20 of the second coupling part 6 which is radially aligned with the outer groove, which are arranged in the fastening portion B. In addition, the locking element 21 is of a springy design and can already be arranged preassembled on the first coupling part, by way of which it slides over the outer contour 19 of the first coupling part 5 when the first coupling part 5 is slid into the second coupling part and subsequently engages into the outer groove 22. The second coupling part 6 additionally comprises an opening 24, into which the locking element 21 can be introduced or from which it can be removed. In other words, this means that the locking element 21 can be pulled out through the opening in order to disconnect the connection of the two coupling parts 5, 6.

In order to ensure a fluidic tightness between the coupling parts 5, 6, a sealing element 25 designed as an O-ring, as shown in FIG. 3, is additionally arranged in the overlap portion A radially between the coupling parts 5, 6 and runs over the entire circumference of the first and thus inner coupling part 5. Here, the sealing element 25 is arranged in a recess 26' of the inner contour 20 of the second coupling part 6 and in an associated recess 26" of the outer contour 19 of the first coupling part 5.

In order to control the flow of the fluid, the first coupling part 5 which is designed as a connector 9 comprises a control element 28 in its interior which is designed as a throttle flap 27. The throttle flap 27 is now arranged in the first coupling part 5 in such a manner that it can regulate the flow of the fluid in a corresponding position. To this end, the throttle plate 28 has a shape which is complementary to the inner contour 29 of the first coupling part 5, wherein the throttle flap 27 is rotatably arranged in the first coupling part 5 about an axis intersecting the centre axis 8.

It is to be understood that the characteristics that are relevant to the invention of the first coupling part 5 and of the first component 2 can be correspondingly transferred to the second coupling part 6 and the second component 3 and vice versa without leaving the scope of this invention.

The invention claimed is:

1. An arrangement for a fluidic and mechanical connection of two components, comprising:
    a first component, a second component, and a coupling, the coupling including a first coupling part arranged on the first component, and
    a second coupling part,
    a damping part moveably connecting the second coupling part to the second component,
    an axial overlap region formed between the damping part and the second coupling part, which axially on the side facing the first component is bounded by a connecting region for realising a mechanical connection between the second coupling part and the damping part,
    wherein the first coupling part and the second coupling part are coaxially pluggable into one another to define a fluidic and mechanical connection, wherein at least one sealing element is radially arranged between the first coupling part and the second coupling part, and
    wherein the second coupling part has an end portion facing the second component arranged in a free-standing manner, and wherein the end portion has a tulip-like shape configured to guide a through-flow of fluid.

2. The arrangement according to claim 1, wherein the damping part includes a bellows.

3. The arrangement according to claim 2, wherein the damping part concentrically encloses the second coupling part.

4. The arrangement according to claim 3, wherein the damping part is connected to the second component via a clamp.

5. The arrangement according to claim 1, wherein the end portion of the second coupling part projects into the second component.

6. The arrangement according to claim 5, wherein the end portion of the second coupling part is radially spaced from the second component and in direct contact with the through-flow of fluid.

7. The arrangement according to claim 1, wherein the tulip-like shape of the end portion projects axially beyond the axial overlap region into the second component.

8. The arrangement according to claim 1, wherein an interior of at least one of the first and second coupling parts includes a control element.

9. The arrangement according to claim 8, wherein the control element includes a throttle flap.

10. The arrangement according to claim 1, further comprising a ring-shaped locking element radially arranged between the first and second coupling parts, the ring-shaped locking element engaging an inner groove of the second coupling part and an outer groove of the first coupling part thereby connecting the first coupling part to the second coupling part, wherein the ring-shaped locking element is enclosed by the second coupling part in an assembled state and selectively removable via an opening disposed radially outside of the inner groove of the second coupling part.

11. The arrangement according to claim 1, wherein the damping part concentrically encloses the second coupling part.

12. The arrangement according to claim 11, wherein at least one of the second coupling part and the damping part form one piece, and the second component and the damping part form one piece.

13. The arrangement according to claim 1, wherein the damping part is connected to the second component via a clamp.

14. The arrangement according to claim 1, wherein at least one of:
    the second coupling part and the damping part are formed in one piece, and
    the second component and the damping part are formed in one piece.

15. A coupling for an arrangement, comprising:
    a first coupling part;
    a second coupling part; and
    a moveable damping part arranged on the second coupling part;
    wherein an axial overlap region is formed between the damping part and the second coupling part, the axial overlap region bounded by a connecting region for realising a mechanical connection between the second coupling part and the damping part;
    wherein the first coupling part and the second coupling part are coaxially pluggable into part one another for a fluid and mechanical connection, wherein at least one sealing element is radially arranged between the first coupling part and the second coupling part; and
    a ring-shaped locking element radially arranged between the first coupling part and the second coupling part when the first coupling part and the second coupling part are coaxially plugged together, the ring-shaped locking element engaging an inner groove of the second coupling part and an outer groove of the first coupling part thereby connecting the first coupling part to the second coupling part, wherein the ring-shaped locking element is enclosed by the second coupling part when the first coupling part and the second coupling part are coaxially plugged together and selectively removable via a radially extending opening disposed in the second coupling part radially outside of the inner groove.

16. The coupling according to claim 15, wherein the damping part includes a bellows.

17. The coupling according to claim 15, wherein the damping part concentrically encloses the second coupling part.

18. The coupling according to claim 15, wherein the second coupling part includes a free-standing end portion, and wherein the free-standing end portion has a tulip-like shape configured to guide a through-flow of fluid.

19. An arrangement for fluidically and mechanically connecting at least two components, comprising:

a first component, a second component, and a coupling;

the coupling including a first coupling part arranged on the first component, and a second coupling part;

a damping part moveably connecting the second coupling part to the second component;

an axial overlap region formed between the damping part and the second coupling part, which axially on the side facing the first component is bounded by a connecting region for realising a mechanical connection between the second coupling part and the damping part;

wherein the first coupling part and the second coupling part are coaxially pluggable into one another to define a fluidic and mechanical connection, wherein at least one sealing element is radially arranged between the first coupling part and the second coupling part; and a ring-shaped locking element radially arranged between the first coupling part and the second coupling part when the first coupling part and the second coupling part are coaxially plugged together, the ring-shaped locking element engaging an inner groove of the second coupling part and an outer groove of the first coupling part thereby connecting the first coupling part to the second coupling part, wherein the ring-shaped locking element is enclosed by the second coupling part when the first coupling part and the second coupling part are coaxially plugged together and selectively removable via a radially extending opening disposed in the second coupling part radially outside of the inner groove.

20. The arrangement according to claim 19, wherein the second coupling part has an end portion facing the component arranged in a free-standing manner, and wherein at least one of:

the end portion has a tulip-like shape configured to guide a through-flow of fluid; and the end portion is radially spaced from the second component and is in direct contact with a through-flow of fluid.

* * * * *